United States Patent [19]
Lee et al.

[11] Patent Number: 5,636,140
[45] Date of Patent: Jun. 3, 1997

[54] SYSTEM AND METHOD FOR A FLEXIBLE MAC LAYER INTERFACE IN A WIRELESS LOCAL AREA NETWORK

[75] Inventors: Dennis Lee, San Jose; Matthew Fischer, Mountain View, both of Calif.

[73] Assignee: Advanced Micro Devices, Inc., Sunnyvale, Calif.

[21] Appl. No.: 519,264

[22] Filed: Aug. 25, 1995

[51] Int. Cl.⁶ .................................................. H04Q 11/04
[52] U.S. Cl. .................. 364/514 C; 375/200; 370/469; 455/54.1; 455/151.2
[58] Field of Search .................. 364/514 C; 375/200; 370/60; 455/54.1, 151.2

[56] References Cited

U.S. PATENT DOCUMENTS

| | | | |
|---|---|---|---|
| 5,327,534 | 7/1994 | Hutchison et al. | 395/200 |
| 5,404,374 | 4/1995 | Mullins et al. | 375/200 |
| 5,410,754 | 4/1995 | Klotzbach et al. | 370/85.13 |
| 5,420,858 | 5/1995 | Marshall et al. | 370/60.1 |
| 5,436,905 | 7/1995 | Li et al. | 370/95 |
| 5,530,694 | 6/1996 | Guezou et al. | 370/16.1 |
| 5,568,470 | 10/1996 | Ben-Hun et al. | 370/17 |

FOREIGN PATENT DOCUMENTS

0459753A2  4/1991  European Pat. Off. .

OTHER PUBLICATIONS

"AMD Plans Intro. of Wireless MAC to Introduce medium–access controller for fall 1995", *Electronic Engineering Times* Jun. 26, 1995.

Padgett, J.E., Gunther, C.G., Hattori, T., "Overview of Wireless Personal Communications," *IEEE Communications Magazine*, Jan. 1995, pp. 28–41.

Links, C., Diepstraten, W., Hayes, V., "Universal Wireless LANs," *BYTE*, May 1994, pp. 99–100, 102, 104, 106, 108.

*Primary Examiner*—Ellis B. Ramirez
*Assistant Examiner*—Patrick Assouad
*Attorney, Agent, or Firm*—Benman Collins & Sawyer

[57] ABSTRACT

A system and method for providing a flexible medium access control device. The medium access control (MAC) device includes four configurable transmit and receive modes for communicating with a physical layer signaling control device. The four modes are controlled by a processor and a transceiver interface. In operation, the modes enable the MAC device to transmit and receive MAC data to and from the physical layer signaling control device, and to optionally transmit and receive PHY data to and from the physical layer signaling control device, thereby providing compatibility between a MAC device and a radio, regardless of the physical layer functionality of the radio.

13 Claims, 8 Drawing Sheets

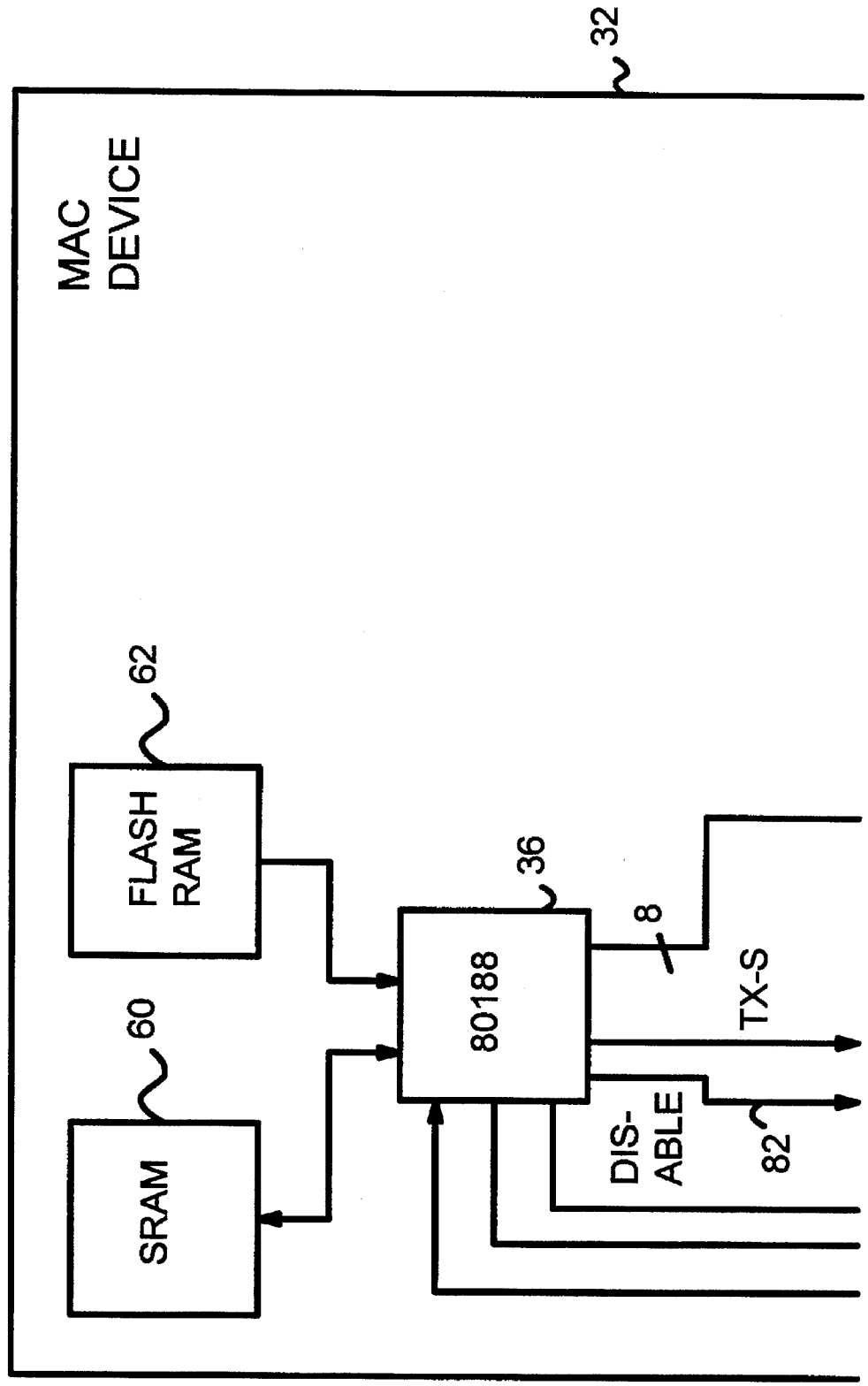

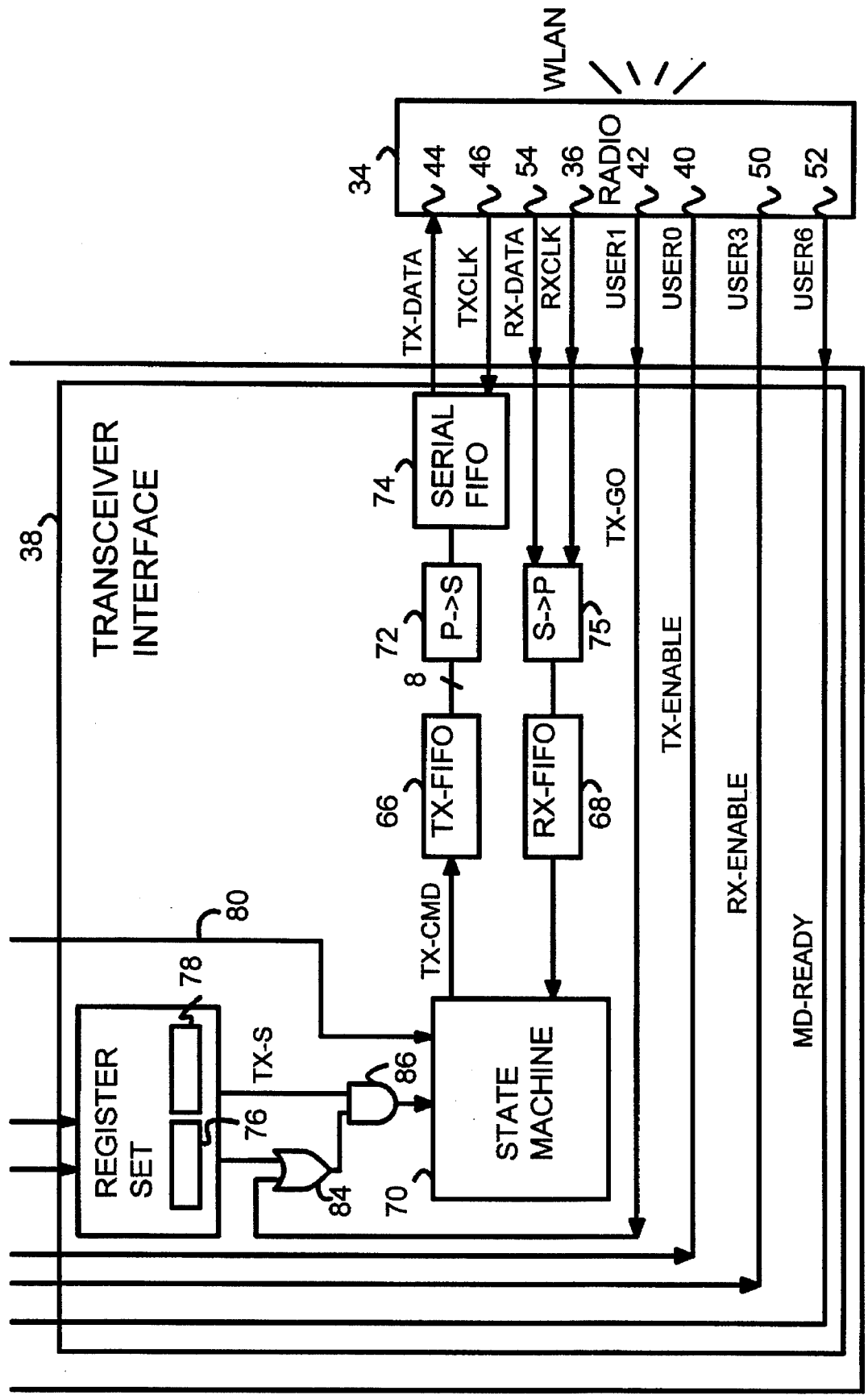

SYSTEM AND METHOD FOR A FLEXIBLE MAC LAYER INTERFACE IN A WIRELESS LOCAL AREA NETWORK

FIELD OF THE INVENTION

The present invention relates to wireless local area networks, and more particularly to a method and system for providing a flexible interface between a medium access control device and a physical device of a wireless local area network.

BACKGROUND OF THE INVENTION

Most networks are organized as a series of layers, each one built upon its predecessor. The purpose of each layer is to offer services to the higher layers, shielding those layers from implementations details. Between each pair of adjacent layers there is an interface that defines those services.

The International Standards Organization has developed a layered network architecture called the Open Systems Interconnection (OSI) Reference model that has seven protocol layers: application, presentation, session, transport, network, data link, and physical.

The function of the lowest level, the physical layer, is to transfer bits over a communication medium. The function of the data link layer is to partition input data into data frames and transmit the frames over the physical layer sequentially. Each data frame includes a header that contains control and sequence information for the frames.

The interface between the data link layer and the physical layer includes a medium access control device, called a MAC device, and physical layer signaling control device, called a PHY device. The purpose of a MAC device and the PHY device is to ensure two network stations are communicating with the correct frame format and protocol.

In wireless local area networks (WLANs), a radio is the physical device, and free space is the physical communications medium. IEEE 802.11 is a proposed standard for WLANs that defines the communication protocol between a MAC device and a radio, the PHY device. WLAN data communication protocol requires that each data frame transferred between the MAC and the PHY devices have a PHY header, a MAC header, MAC data, and error checking fields. The PHY header includes a preamble that is used to indicate the presence of a signal, unique words, frame length, etc. The MAC header includes frame control, duration, source and destination address, and data sequence number, etc.

Although draft standard 802.11 defines the logical PHY/MAC interface, 802.11 does not define the physical interface between a MAC device and a PHY device. For example, assuming that the draft standard provides that a byte of information is to be passed from the MAC device to the PHY, the draft standard does not provide how the byte is be transferred. That is, the draft standard does not provide a physical definition as to whether the byte is passed as eight bits in parallel, or as one bit in serial using eight clock cycles. In addition to the draft WLAN standard, many proprietary WLANs exists that define various different physical interfaces between the MAC device and the PHY device.

Due to the lack of a coherent WLAN standard, different radio vendors incorporate various portions of the physical layer function inside the radio. Some radios, for example, are capable of generating the PHY data, while other radios require that the MAC device generate the PHY data. Therefore, current MAC devices must be tailored to meet the requirements of a specific radio.

Accordingly, what is needed is a flexible MAC interface that provides compatibility between a MAC device and a radio, regardless of the physical layer functionality of the radio.

SUMMARY OF THE INVENTION

The present invention provides a method and system for providing a flexible medium access control device. The medium access control device comprises an interface for communicating with a physical layer signaling control device, a processor for controlling the transceiver interface, such that MAC data is transmitted and received to and from the physical layer signaling control device, and PHY data is optionally transmitted and received to and from the physical layer signaling control device.

According to the system and method disclosed herein, the present invention provides a flexible MAC interface that provides compatibility between a MAC device and radios of varying physical layer functionality.

BRIEF DESCRIPTION OF THE DRAWINGS

FIG. 5 is a detailed block diagram of the MAC device of the present invention.

DESCRIPTION OF THE INVENTION

The present invention relates to an improvement in the interface between the MAC layer and the physical layer in WLANS. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Proposed IEEE standard 802.11 defines several frame formats called the physical layer convergence procedure (PLCP) for transferring data between a MAC device and a radio. The PLCP frame formats provides for the asynchronous transfer of MAC layer information from any transmitting station to all receiving stations within a WLAN.

Figure 1:
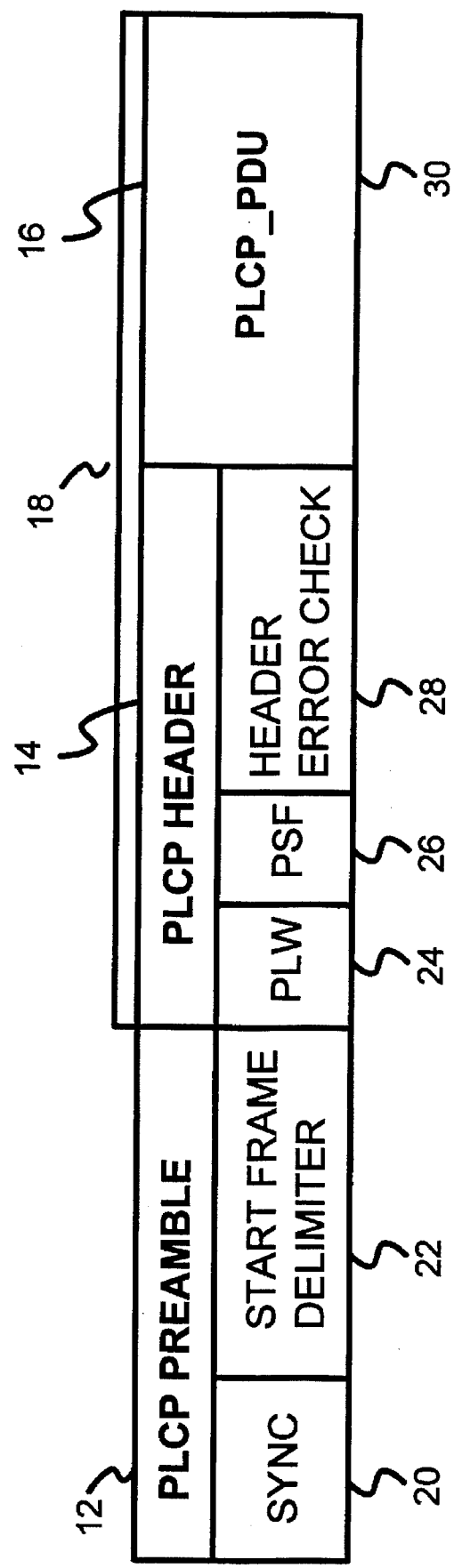
FIG. 1 is a block diagram depicting on PLCP frame format defined by proposed IEEE standard 802.11, entitled "Frequency Hopping Spread Spectrum Physical Layer Specification."

FIG. 1 is a block diagram depicting on PLCP frame format 10 defined by proposed IEEE standard 802.11 "Frequency Hopping Spread Spectrum Physical Layer Specification", The present invention can work with any frequency hopping radios, direct sequence radios, or infrared radios, but frequency hopping frame format is used as an example to more clearly illustrate the principles being disclosed. Accordingly, many types of radios may be utilized and their use would be within the spirit and scope of the present invention.

The PLCP frame 10 comprises three parts: a PLCP preamble 12, a PLCP header 14, and a PLCP protocol data unit (PDU) 16. The PLCP preamble 12 includes two subfields, the sync field 20 and the start frame delimiter 22. The sync field 20 is used by the radio to detect a signal to receive, and to reach steady state frequency offset correction and synchronization. The start frame delimiter 22 is used to indicate the end of PLCP preamble and beginning of PLCP header.

The PLCP header 14 includes three subfields, a PLCP length word (PLW) 24, a PLCP signaling field (PSF) 26, and PLCP header error check (HEC) field 28. The PLW 24 indicates the number of octets contained in the PLCP-PDU 16. The PSF 26 indicates the bit rate of the PLCP-PDU 16, and the HEC field 28 is used to detect transmission errors in the PLCP-PDU 16. Draft standard 802.11 defines the boundary between PHY and MAC as being between the PLCP header 12 and the PLCP-PDU 16. However, this invention is operable in any boundary defined between the sync field 20 and the PLCP-PDU 16. For purposes of this discussion, the PLCP preamble 12 will be referred to as PHY data, and the PLCP header 14 and the PLCP-PDU 16 will be referred to as MAC data 18.

Draft standard IEEE 802.11 suggests that the PHY data 12 should be generated by the physical device, which in WLANs, include the radio. Generating PHY data 12, however, generally involves digital operations, while radios are mostly analog devices. Therefore, analog-only radios require that the MAC device generates the PHY data 12, since a MAC device performs digital operations. Another type of radio, however, is designed according to the draft standard, and incorporates digital logic to perform this function.

Because of this varying functionality, current MAC devices are designed to either 1) generate and receive both PHY data 12 and MAC data 18 to accommodate one type of radio, or 2) to generate and receive MAC data 18 only to accommodate the other type of radio. Thus, WLAN MACS face portability problems since most current MAC devices are compatable with only one PHY implementation.

The present invention is a flexible MAC interface that operates both with radios that fail to incorporate all PHY functionality, and with those that do incorporate all PHY functionality. The flexible MAC device optionally performs the generation of PHY data if required by the radio, or performs only the MAC function should the radio perform the generation of PHY data. To more particularly illustrate the flexible MAC interface of the present invention, refer now to FIGS. 2A and 2B.

Figure 2A:
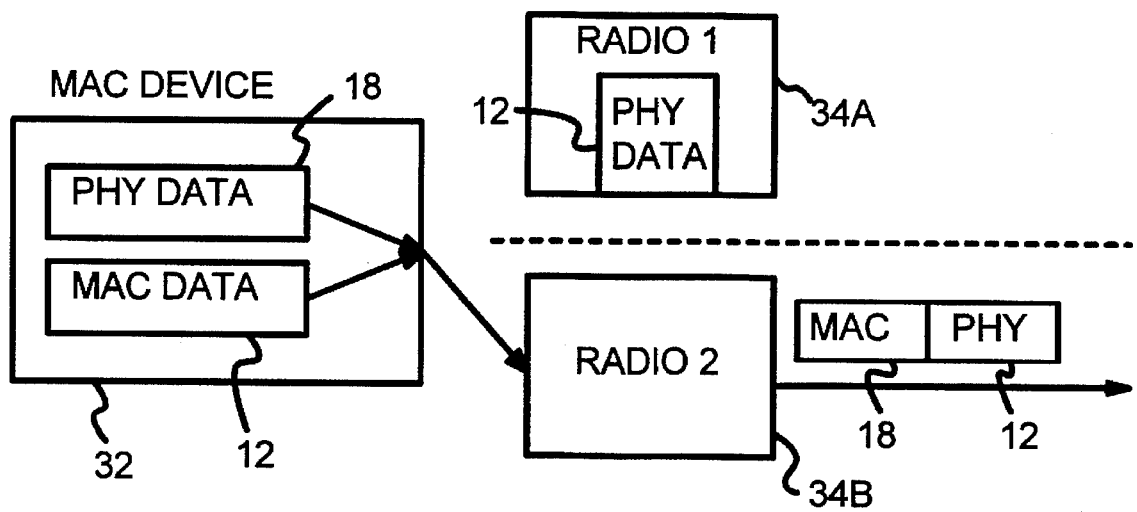
FIGS. 2A and 2B are block diagrams depicting a MAC device of the present invention interfacing with radios having different physical layer functionality.
Figure 2B:
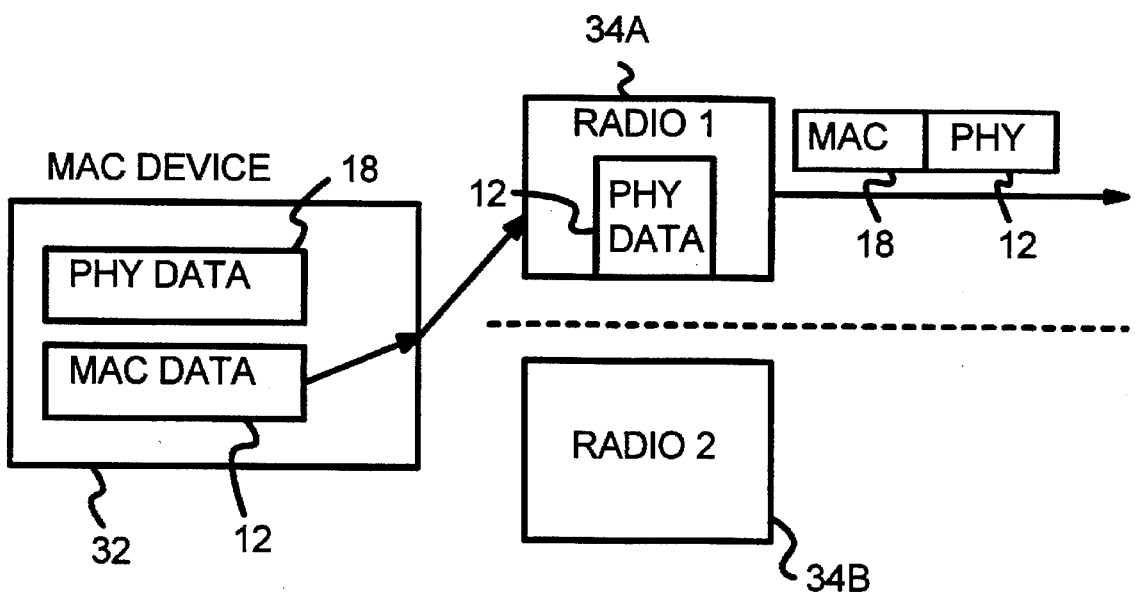

FIGS. 2A and 2B are a block diagrams depicting a MAC device of the present invention interfacing with radios having different physical layer functionality. According to the present invention, the MAC device 32 can be configured to generate both PHY data 12 and MAC data 18, as shown in FIG. 2A, or MAC data 18 only, as shown in FIG. 2B.

Referring now to FIG. 2A, when configured to generate both PHY data 12 and MAC data 18, the MAC device 32 is compatible with a radio 34B, which does not include the functionality to generate PHY data 12. In this configuration, the MAC device 32 generates PHY data 12 and MAC data 18, and transfers them to the radio 34B, where they are broadcast across WLAN (not shown).

Referring now to FIG. 2b, when configured to generate MAC data 18 only, the MAC device 32 is compatable with a radio 34A that includes the functionality to generate PHY data 12. In this configuration, radio 34A generates the PHY data 12, and the MAC device 32 generates and transfers the MAC data 18 to the radio 34A, where the PHY data 12 is broadcast across WLAN followed by the MAC data 18.

Since the MAC device 32 both transmits and receives dam, there are two transmit modes; 1) transmit both PHY and MAC data 12 and 18, and 2) transmit MAC data only, and two receive modes: 1) receive both PHY and MAC data 12 and 18, and 2) receive MAC data only. The transmit and receive modes are achieved by providing additional hardware and control to define the signaling necessary to accommodate both type of operations.

Figure 3:
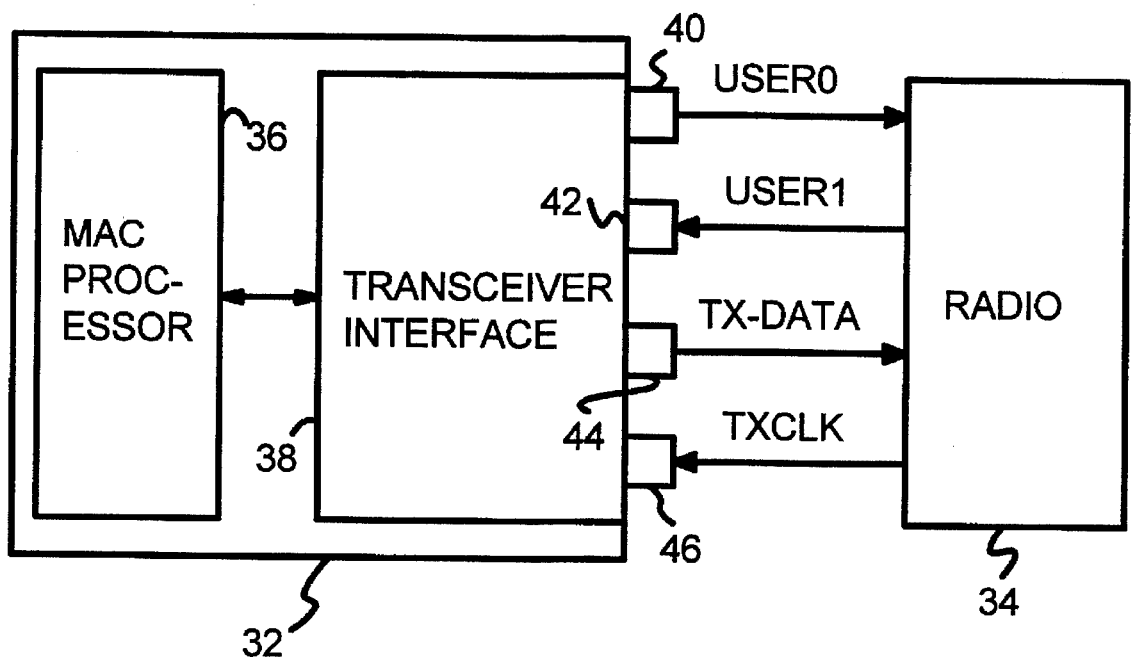
FIG. 3 is a block diagram of a communication interface between the MAC device and the radio in transmit mode.

Referring now to FIG. 3, the communication interface between the MAC device 32 and the radio 34 in transmit mode are shown. The MAC device 32 communicates with the radio using a processor 36 and a transceiver interface 38. The transceiver interface 38 provides signal pins to connect the MAC device 32 directly to the radio 34.

Four signal pins are used to transmit data from the MAC device 32 to the radio 34: USER0 40, USER1 42, TX-DATA 44, TXCLK 46. USER0 40 is an output from the MAC device 32, and it is used to inform the radio 34 that the MAC device 32 is ready to transmit data. USER1 42 is an input to the MAC device 32, and it is used to inform the MAC device 32 that the radio 34 has transmitted PHY data 12 and is ready to receive MAC data 18 from the MAC device 32. TX-DATA 44 is an output from the MAC device 32 for transmitting PHY data 12 and/or MAC data 18. TXCLK 46 is an input or an output from the MAC device 32, and at the rising edge of the TXCLK 46, TX-DATA 44 is latched to the radio 34.

Figure 4:
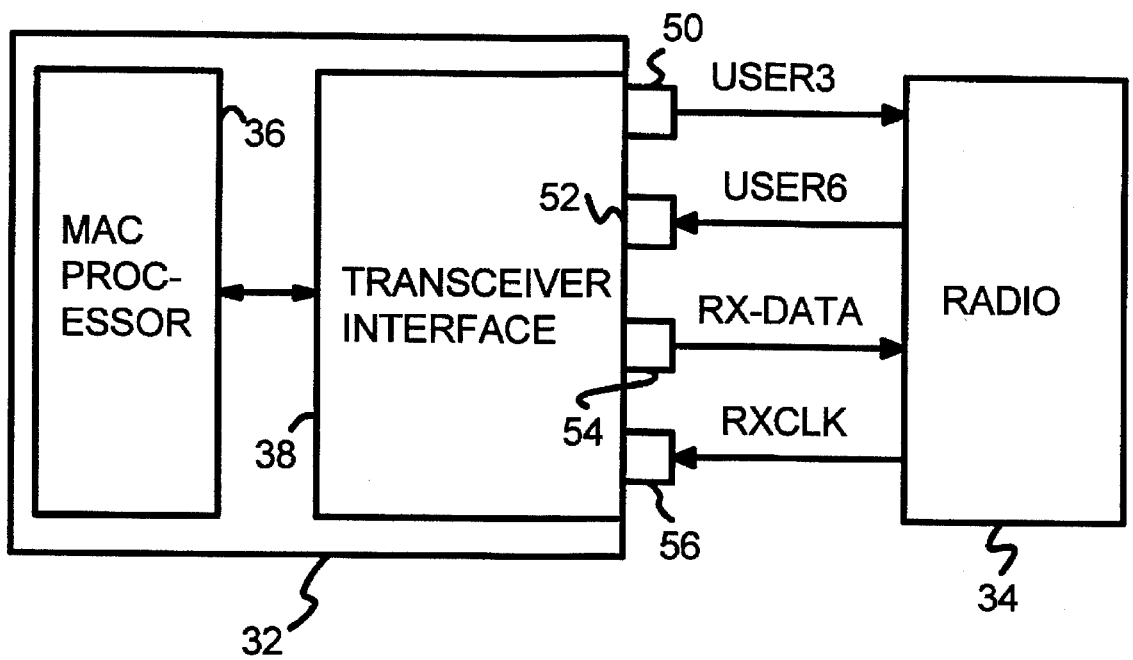
FIG. 4 is a block diagram of the communication interface between the MAC device and the radio in receive mode.

Referring now to FIG. 4, the signal pins used during the receive mode between the MAC device 32 and the radio 34 are shown. Four pins are used to receive data from the radio 34 to the MAC device 32: USER3 50, USER6 52, RX-DATA 54, RXCLK 56. USER3 50 is an output from the MAC device 32, and it is used to inform the radio 34 that MAC device 32 is ready to receive data. USER6 52 is an input to the MAC device 32, and it is used to signal the MAC device 32 that the radio 34 is ready to send MAC data 18 to the MAC device 32. RX-DATA 54 is an input to the MAC device 32 for receiving PHY data 12 and/or MAC data 18. RXCLK 56 is an input to the MAC device 32, and at the rising edge of RXCLK 56, RX-DATA 54 is latched to the MAC device 32. In a second preferred embodiment of the present invention, a receive dock signal is derived from RXDATA 54, making RXCLK 56 unnecessary.

According to the present invention, the MAC device 32 is configurable to operate in any combination of transmit modes and receive modes as shown below:

|  | TRANSMIT | RECEIVE |
| --- | --- | --- |
| mode 1 | PHY and MAC Data | PHY and MAC Data |
| mode 2 | PHY and MAC Data | MAC only Data |
| mode 3 | MAC only Data | PHY and MAC Data |
| mode 4 | MAC only Data | MAC only Data |

Figures 5, 5A, 5B:
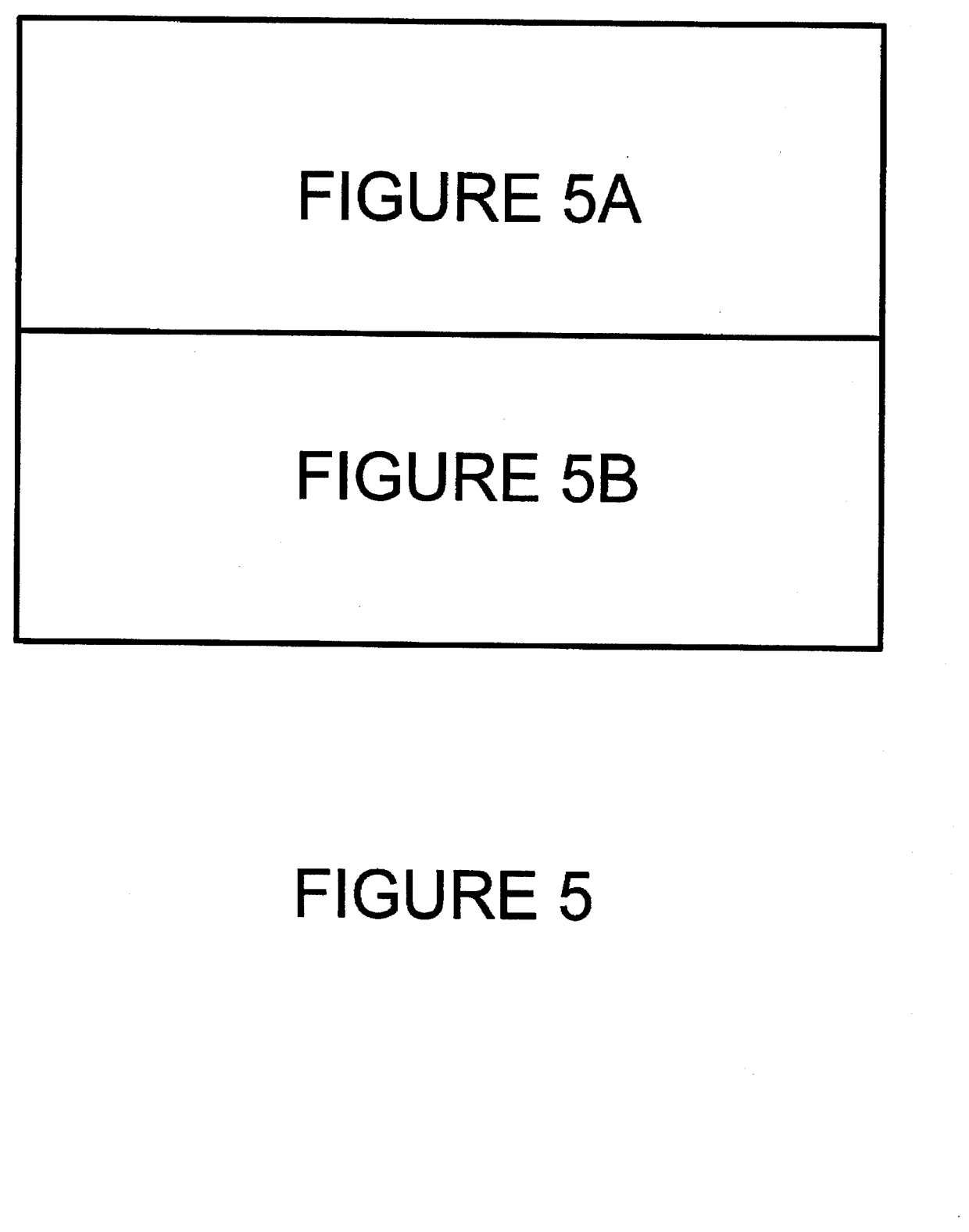

To illustrate how the MAC device 32 provides the four transmit and receive modes, refer now to FIG. 5 depicting a detailed block diagram of one embodiment of such a system.

Besides the processor 36 and transceiver interface 38, the MAC device 32 includes a static random access memory (SRAM) 60 for storing user data, and a flash RAM 62 for storing system programs. In a preferred embodiment of the present invention, the processor 36 is an 80188 microcontroller. The transceiver interface 38 includes a register set 64, a transmit first-in first-out queue (tx fifo) 66, a receive first-in first-out queue (rx fifo) 68, a state machine 70, a parallel-to-serial shift-register 72, a serial fifo 74, and a serial-to-parallel shift-register 75.

One function of the state machine 70 is to control the timing and the signaling of pins on the MAC device. The functionality of the state machine 70 is dependent on the settings of the register set. According to the present invention, the 80188 places the state machine 70 in a particular transmit and receive mode by altering the settings of the register set 64.

More specifically, upon boot-up the 80188 fetches and executes instructions from the flash memory. In response to the instructions, the 80188 to initializes the register set 64, including a tx_mac_only register bit 76 and a rx_mac_only register bit 78 in order to set the mode of the MAC device 32. The 80188 establishes a mode by setting or resetting the ti_mac_only register bit 76 and the rx_mac_only register bit 78 as follows:

|  | TX_MAC_ONLY BIT | RX_MAC_ONLY BIT |
| --- | --- | --- |
| mode 1 | reset | reset |
| mode 2 | reset | set |
| mode 3 | set | reset |
| mode 4 | set | set |

Another function of the state machine 70 is to control the operation of both the tx-fifo 66 and the rx-fifo 68. Both the tx-fifo 66 and the rx-fifo 68 are used to provide data buffering between the 80188 and the radio 34. When data is transmitted by the radio 34, the rx-fifo 66 maintains a constant data rate from the 80188 to the radio 34, and when data is received from the radio 34 the rx-fifo 68 maintains a constant data rate from the radio 34 to the 80188.

The function of the SRAM 60 is to store user data. When the SRAM 60 contains data that is to be transmitted over the WLAN, the 80188 formats the data according to the preselected mode and transfers the formatted data to the tx-fifo 66 over an eight-bit data bus 80. When the MAC device 32 receives data from the radio 34, the data is stored in the rx-fifo 68 before the 80188 transfers the data to the SRAM 60.

Figure 6:
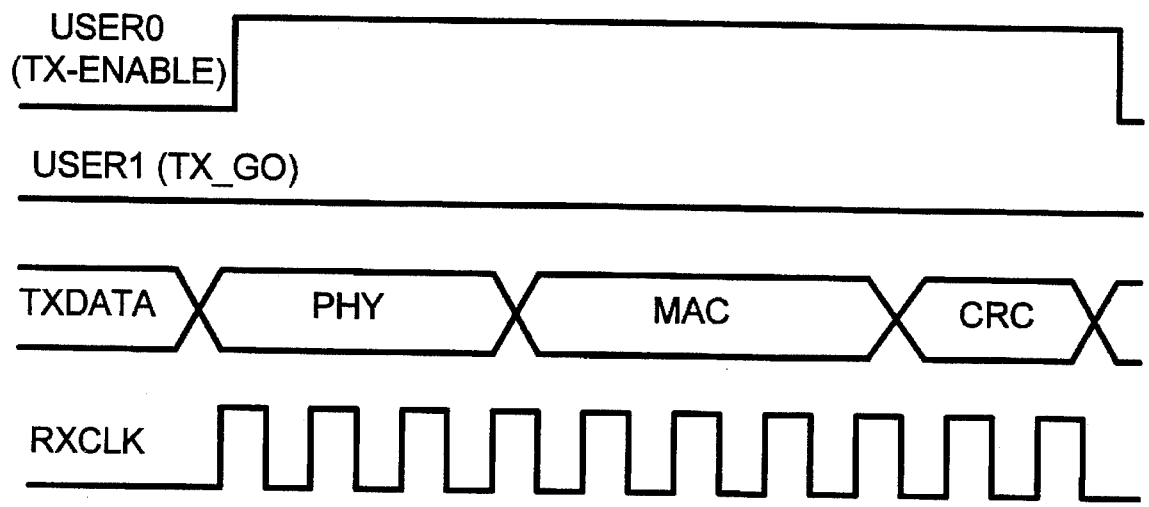
FIG. 6 is a timing diagram of the external signals transferred between the MAC device and a radio when the MAC device transmits both PHY data and MAC data to the radio.

FIG. 6 is a timing diagram of the external signals transferred between the MAC device 32 and the radio 34 when the MAC device 32 is congifured to transmit both PHY data 12 and MAC data 18 to the radio 34 (modes 1 and 2).

Referring to both FIGS. 5 and 6, after the 80188 has formatted the data in the SRAM 60 into PHY data 12 and MAC data 18 and transfers the formatted data to the tx-fifo 66, the 80188 begins by asserting a tx_enable signal on USER0 40 to inform the radio 34 that data is to be transmitted. In response, the radio 34 generates its own ramp-up signals. At the same time, the 80188 enables the transmit state machine 70 for operation and begins the transmit operation, by asserting an internal transmit-start (tx_s) signal. To begin the transmit operation in modes 1 and 2, the 80188 must also assert an internal disable signal 82, which is input to an Or-gate 84. The output of the Or-gate 84 is, in turn, input into an AND gate 86 along with tx-s. Asserting the disable signal 82 allows an active tx_s signal to reach the state machine 70.

In response to the tx-s signal, the state machine 70 sends a transmit command to the tx-fifo 66 signaling the tx-fifo 66 to begin outputting its data. The output of the tx-fifo 66 is input to a parallel-to-serial shift-register 72 for converting the eight bit parallel data from the tx-fifo 66 to one-bit serial data. The serial data is then stored in the serial fifo 74. At the rising edge of TXCLK 46, the data in the serial fifo 74 is latched to the radio 34 over TX-DATA 44 in order of PHY data 12 followed by MAC data 18. In modes 1 and 2, pin USER1 42 is not used. After transmitting the MAC data 18, the tx_enable and tx-s signals are deasserted to indicate the end of transmission.

Referring again to FIG. 5, when the MAC device 32 is configured to generate and send only MAC data 18 (modes 3 and 4), the radio is assumed to contain PHY functionality for generating PHY data 12. The 80188 does not automatically generate and then store PHY data 12 in the tx-fifo 66. Instead the 80188 generates and stores only MAC data 12 in the tx-fifo 66. Since the tx-fifo 66 only contains MAC portion of the frame, the 80188 cannot signal the state machine 70 to begin transmitting data from the tx-fifo 66 to the radio for transmission because the PHY data 12 has not yet been generated. Therefore, an important requirement is providing correct timing between the MAC device 32 to the radio 34 to enable the radio 34 to broadcast the MAC data 18 over the WLAN immediately following the radio 34 generated PHY data 12.

Figure 7:
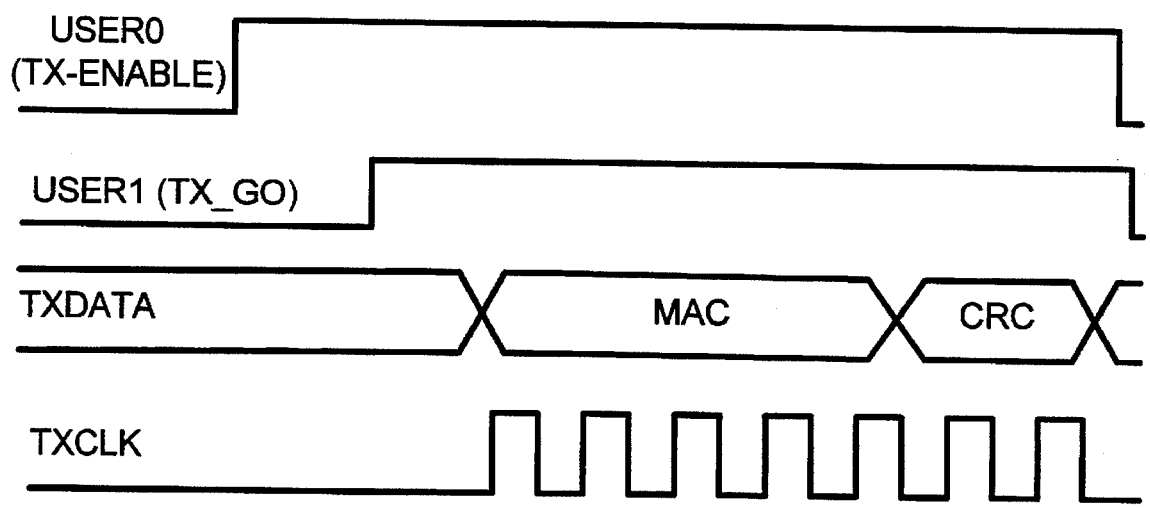
FIG. 7 is a timing diagram of the external signals transferred between the MAC device and the radio when the MAC device transmits only MAC data to the radio.

FIG. 7 is a timing diagram of the external signals transferred between the MAC device 32 and the radio 34 when the MAC device 32 is configured to transmit only MAC data 18 to the radio 34 (modes 3 and 4). Referring now to both FIGS. 5 and 7, the 80188 begins by asserting a tx_enable signal on USER0 40 to inform the radio 34 that data is to be transmitted. In response, the radio 34 generates its own ramp-up signals. At the same time, the 80188 enables the state machine 70 for operation, but will not start the transmit operation. This is done by asserting the tx-s signal, while deasserting the disable signal.

After a brief start-up delay associated with ramp-up, the radio 34 begins generating the PHY data 12 and immediately broadcasts the PHY data 12 over the WLAN. Just before the radio 34 has completed generating and transmitting all the PHY data 12, the radio 34 sends a tx-go signal to the state machine 70 via pin USER1 42 to signal the MAC device 34 that the radio 34 is ready for the MAC data 18.

In response to the tx-go signal, which is input to the AND gate 86 along with the tx-s signal, the state machine 70 serializes the MAC data 18 in the tx-fifo 66, as described above, and stores it in the serial fifo 74. In a preferred embodiment the serial fifo 74 is sixteen bits in length and must contain at least eight bits before any data can be read by to the radio 34. The radio 34 must transmit the tx-go signal before the radio 34 has completed transmitting the PHY data 12 due to the delay associated with filling the serial fifo 74 halfway with MAC data 18, which requires eight clocks in a preferred embodiment of the present invention.

When the radio 34 has finished transmitting the PHY data 12 and requires the first bit of MAC data 18, the radio 34 asserts TXCLK 46, and the MAC data 18 is latched to the radio 34 via TX-DATA 44 for transmission following the PHY data 12. This provides a smooth transition from the radio 34 generated PHY data 12 to MAC device 32 generated MAC data 18. When the MAC data 18 has finished transmitting, the radio 34 deasserts the tx-go signal and ramps down. The MAC device 32 then resets. Alternatively, the 80188 can deassert tx-enable on USER0 40 to indicate the end of transmit mode.

Figure 8:
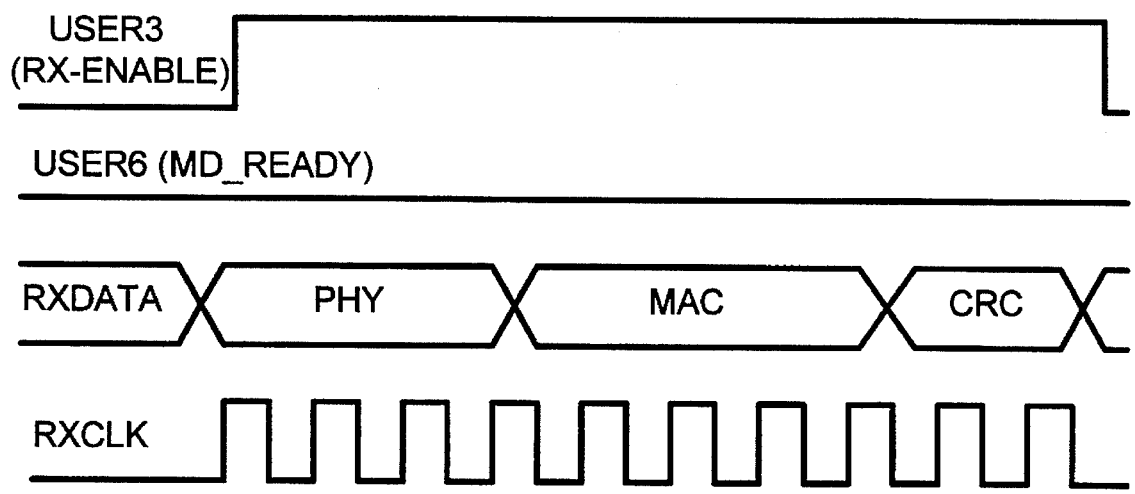
FIG. 8 is a timing diagram of the external signals transferred between the MAC device and the radio when the MAC device receives both PHY data and MAC data from the radio.

When the MAC device 32 is in receive mode, the operation is similar to the transmit mode. FIG. 8 is a timing diagram of the external signals transferred between the MAC device 32 and the radio 34 when the MAC device 32 is configured to receive both PHY data 12 and MAC data 18 from the radio 34 (modes 1 and 3).

Figure 9:
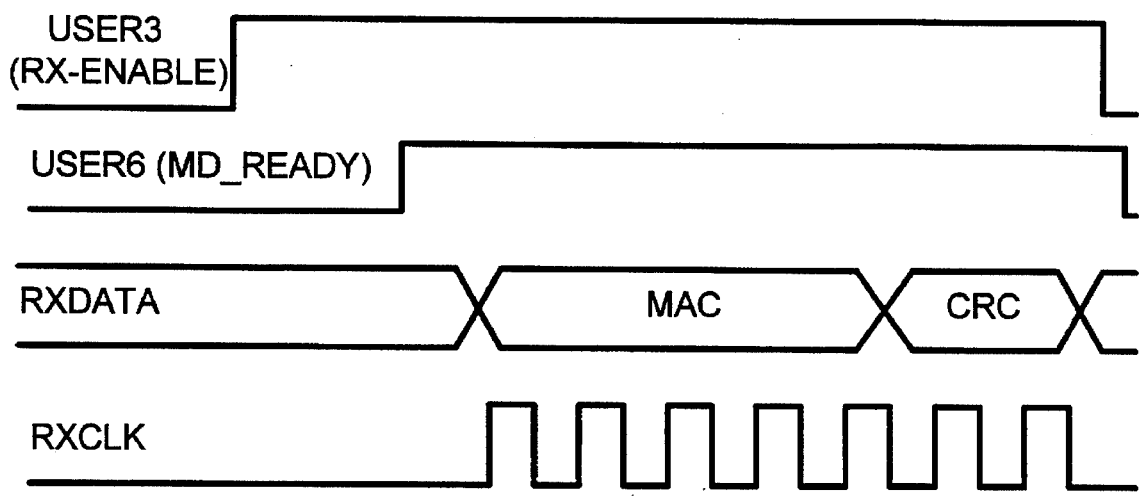
FIG. 9 is a timing diagram of the external signals transferred between the MAC device and the radio when the MAC device receives only MAC data from the radio.

Referring now to both FIGS. 5 and 8, when the MAC device 32 is ready to receive data from the WLAN, the 80188 asserts an rx_enable signal on USER3 50. When the radio 34 receives data from the WLAN, the radio 34 asserts RXCLK 56 and latches the received data to the MAC device 32 via RX-DATA 54. The data is input to the serial-to-parallel shift-register 75 and then stored in the rx-fifo 68. After the completion of the receive operation, the 80188 deasserts USER3 50. The pin USER6 52 is not used in modes 1 and 3. FIG. 9 is a timing diagram of the external signals transferred between the MAC device 32 and the radio 34 when the MAC device 32 is configured to receive only MAC data 18 from the radio 34 (modes 2 and 4).

Referring now to both FIGS. 5 and 9, when the MAC device 32 is ready to receive data, the 80188 asserts the rx_enable signal on USER3 50. When the radio 34 receives data from the WLAN, the radio 34 detects and removes the PHY data 12 from the message. After receiving all of the PHY data 12, the radio 34 asserts an md_ready signal on pin USER6 52 to indicate that the radio 34 is sending MAC data 18 to the MAC device 32. At the same time, the radio 34 asserts RXCLK 56 and latches the received MAC data 18 to the MAC device 32 via RX-DATA 54. The data is input to the serial-to-parallel shift-register 75 and then stored in the rx-fifo 68. After the completion of the receive operation, the 80188 deasserts USER3 50.

A MAC device has been disclosed that provides a flexible MAC interface for communicating both with radios that incorporate the functionality to generate PHY data and with radios that do not incorporate the functionality to generate PHY data.

Although the present invention has been described in accordance with the embodiments shown, one of ordinary skill in the art will readily recognize that there could be variations to the embodiments and those variations would be within the spirit and scope of the present invention. For example, since IEEE 802.11 is only a proposed standard as of the date of this application has not yet been approved, the fields of the frames may change. In addition, proprietary formats may have additional or missing fields. What is of importance is a division of PHY fields and MAC fields and that the present invention provides a flexible method for generating those fields by either the MAC device or the physical device, or any combination thereof, to thereby provide compatibility between MAC devices and physical devices having different protocols. Accordingly, many modifications may be made by one of ordinary skill in the art without departing from the spirit and scope of the appended claims.

What is claimed is:

1. A medium access control device comprising:
   an interface for communicating with a physical layer signaling control device; and a processor for controlling the transceiver interface, such that MAC data is transmitted and received to and from the physical layer signaling control device, and PHY data is optionally transmitted and received to and from the physical layer signaling control device, wherein the interface and the processor provide:
   a first mode for transmitting PHY and MAC data, and for receiving PHY and MAC data;
   a second mode for transmitting PHY and MAC data, and for receiving MAC data only;
   a third mode for transmitting MAC data only, and for receiving PHY and MAC data; and
   a fourth mode for transmitting MAC data only, and for receiving MAC data only.

2. A medium access control device as in claim 1 further comprising:
   a first RAM for storing user data; and
   a second RAM for storing a system program.

3. A medium access control device as in claim 2 wherein the physical layer signaling control device comprises a radio.

4. A medium access control device as in claim 3 wherein the interface comprises a transceiver interface.

5. A medium access control device as in claim 4 wherein the transceiver interface further includes a state machine and a register set.

6. A medium access control device as in claim 5 wherein the system program for controls the processor;
   the processor for sets and resets the register set; and
   the register set for controls the state machine.

7. A medium access control device as in claim 6 wherein the register set includes a first and second register, and wherein
   the first register is reset and the second register is reset to provide the first mode;
   the first register is reset and the second register is set to provide the second mode;
   the first register is set and the second register is reset to provide the third mode; and
   the first register is set and the second register is set to provide the fourth mode.

8. A method for providing a flexible interface between a medium access control (MAC) device and a physical layer signaling control (PHY) device in a wireless local area network, the method comprising the steps of:
   (a) transmitting both PHY data and MAC data from the MAC device to the PHY device when the PHY device does not include the functionality to generate PHY data; and
   (b) transmitting MAC data only from the MAC device to the PHY device when the PHY device includes the functionality to generate PHY data.

9. A method as in claim 8 further including the steps of:
   (c) receiving both PHY data and MAC data in the MAC device from the PHY device when the PHY device does not include the functionality to generate PHY data; and
   (d) receiving MAC data only in the MAC device from the PHY device when the PHY device includes the functionality to generate PHY data.

10. A method as in claim 8 wherein step (a) further includes the steps of:
- (a1) asserting a transmit enable signal from the MAC device to the PHY device to ramp up the PHY device;
- (a2) asserting a transmit clock signal;
- (a3) in response to the transmit clock signal, latching a transmit data signal to send the PHY and MAC data to the PHY device from the MAC device; and
- (a4) broadcasting the PHY data and MAC data over the WLAN.

11. A method as in claim 8 wherein step (b) further includes the steps of:
- (b1) asserting the transmit enable signal from the MAC device to the PHY device to ramp up the PHY device;
- (b2) generating PHY data in the PHY device;
- (b2) broadcasting the PHY data over the WLAN;
- (b4) asserting a transmit-go signal from the PHY device to the MAC device before all the PHY data has been broadcast to request MAC data from the MAC device;
- (b5) asserting a transmit clock signal;
- (b6) in response to the transmit clock signal, latching a transmit data signal to send MAC data to the PHY device from the MAC device; and
- (b7) broadcasting the MAC data over the WLAN immediately following the PHY data.

12. A method as in claim 9 wherein step (c) further includes the steps of:
- (c1) asserting a receive enable signal from the MAC device to the PHY device;
- (c2) receiving PHY data and MAC data from the WLAN in the PHY device;
- (c3) asserting a receive clock signal from the PHY device to the MAC device; and
- (c4) in response to the receive clock signal, latching a receive data signal to send the PHY and MAC data from the PHY device to the MAC device.

13. A method as in claim 9 wherein step (d) further includes the steps of:
- (d1) asserting a receive enable signal from the MAC device to the PHY device;
- (d2) receiving PHY data from the WLAN in the PHY device;
- (d3) after receiving the PHY data,
  - (d3i) receiving MAC data from the WLAN, and
  - (d3ii) asserting a data ready signal from the PHY device to the MAC device,
  - (d3iii) asserting a receive clock signal, and
- (d4) in response to the receive clock signal, latching a receive data signal to send the MAC data from the PHY device to the MAC device.

* * * * *